United States Patent [19]
Lee et al.

[11] 3,900,415
[45] Aug. 19, 1975

[54] MAGNETIC GLASS

[75] Inventors: Thomas E. Lee, Baton Rouge; Sebastian M. Laurent, Greenwell Springs, both of La.

[73] Assignee: Ethyl Corporation, Richmond, Va.

[22] Filed: Sept. 4, 1973

[21] Appl. No.: 394,046

Related U.S. Application Data

[63] Continuation-in-part of Ser. No. 184,291, Sept. 27, 1971, abandoned.

[52] U.S. Cl. ........ 252/62.51; 252/62.58; 252/62.59; 106/52
[51] Int. Cl. ....... C04b 35/00; H01f 1/00; C03c 3/04
[58] Field of Search ........ 106/52; 252/62.51, 62.55, 252/62.58, 62.59

[56] References Cited
UNITED STATES PATENTS

| | | | |
|---|---|---|---|
| 3,003,886 | 10/1961 | Pither | 106/52 |
| 3,169,217 | 2/1965 | Dalton | 106/52 |
| 3,326,702 | 6/1967 | Babcock | 106/52 |
| 3,627,548 | 12/1971 | Hammer et al. | 106/52 |

*Primary Examiner*—Winston A. Douglas
*Assistant Examiner*—Mark Bell
*Attorney, Agent, or Firm*—Donald L. Johnson; John F. Sieberth; Paul H. Leonard

[57] ABSTRACT

A magnetic glass prepared from calcination of an alkali metal alumino silicate and iron sulfide.

8 Claims, No Drawings

MAGNETIC GLASS

CROSS-REFERENCE TO RELATED APPLICATION

This application is a continuation-in-part of U.S. application Ser. No. 184,291, filed on Sept. 27, 1971, now abandoned.

The present invention relates to a new glass composition having magnetic properties and to a method of preparing such magnetic glass.

The invention provides a unique product which is useful in providing glass fiber reinforcement, electronic resistors and capacitors, and throw away glass containers.

Additionally, the novel glass of the instant invention may be used for frostless windows and windshields, for glass film electrodes such as a pH meter type and for photochromic glass.

Fibers of magnetic glass can be prepared and dispersed in metals, plastics and the like. A polarized magnetic field can be applied to orient the glass fibers unidirectionally. Ultra high strength plastics can be produced.

A chemically inert magnetic glass can be used for manufacturing glass valves and solenoids for chemical processing equipment where corrosion is a problem.

Other aspects and advantages of the invention will become apparent from the ensuing detailed description.

It has been unexpectedly discovered that a glass composition having magnetic properties may be prepared by calcining an alkali metal alumino silicate with an iron sulfide. An alkali metal alumino silicate is defined as any natural ore or synthetic material containing substantial amounts of aluminum, silicon and an alkali metal. Sodium, potassium, or mixtures thereof are the preferred alkali metals. These elements may be compounded with other elements, especially oxygen, e.g. $SiO_2$, $SiO_4$, $Al_2O_3$, $K_2O$, $Na_2O$. Of the natural minerals, those having the general formula $M_xAl_y(SiO_4)_2$ or $M_xAl_ySi_zO_a$, wherein $x$, $y$ and $z$ are integers from 1 to 3 and $a$ is an integer in accordance with $z$, are preferred. The alkali metal alumino silicate comprises by weight about 7–13 percent alkali metal oxide, 20–38 percent alumina, and 50–73 percent silica.

In a preferred embodiment of the present invention an alkali metal alumino silicate, such as a sericitic-quartzite or sericite and quartz, and an iron sulfide such as pyrite are mixed together and calcined at a temperature of from about 1200°C to about 1600°C for about 12 hours in an oxygen-free atmosphere. A slight reducing atmosphere is also preferable. After calcination, the calcined material is crushed and subjected to magnetic separation. The black, magnetic amorphous fraction is heated again from about 1200°C to about 1600°C to produce a magnetic amorphous material or magnetic glass which is black or dark purple in color.

A composition comprising about 10% $M_2O$, 30% $Al_2O_3$, 40% $SiO_2$ and 20% $FeS_2$ produces a good quality magnetic glass. M is any alkali metal but is preferably potassium or sodium.

Magnetic glass made from a natural sericite and pyrite contained sodium and potassium at a ratio of one part sodium to four parts potassium.

Sericite is a naturally occurring ore and is a flaky or fine scaly form of muscovite or phengite and characterized by its silky luster. Its chemical composition is usually $KAl_2Si_3AlO_{10}(OH,F)_2$, $KH_2Al_2(SiO_4)_3$ or $H_2KAl_3$ ($SiO_4$). Sericite also contains sodium, with the content ≤ 2.9% Na. It may also contain small amounts of calcium, lithium, magnesium and iron. It often results from hydrothermal alteration of feldspar. Muscovite often has a sodium and potassium ratio of 1:1 or 1:5.

In addition to sericite some suitable natural minerals are mica, the various forms thereof, such as muscovite, biotite, lepidolite, paragonite, etc., the feldspars, especially albite, anorthoclase, orthoclase, microcline and hyalophane, and others such as leucite, analcite, nepheline, kaliophylite and eucryptite. Other natural minerals or synthetic compounds or mixtures containing desired quantities of Al, Si, Na or K can also be used. The natural minerals may also contain minor amounts of other elements or impurities. These can be used in various amounts to produce magnetic glass having desired end properties.

The foregoing minerals are frequently found in ores containing large amounts of quartz or $SiO_2$. Cristobalite and tridymite are examples of common quartz minerals. The term "quartzite" usually refers to fine crystalline quartz in which the individual crystals are not easily recognized by the naked eye. The term "sericitic-quartzite" is used hereinafter to refer to a mixture of fine grained quartz and fine needle-like muscovite.

Pyrite or iron pyrite is a naturally occurring iron sulfide usually identified as $FeS_2$.

Pyrrhotite or magnetic pyrite is normally FeS or $Fe_5S_6$-$Fe_{16}S_{17}$. Marcasite, $FeS_2$, may be used in lieu of pyrite. These can be used in various amounts to produce magnetic glass having desired end properties.

Additional sources of magnetic glass are furnace slags, bauxite digestion residues (red mud) and mineral beneficiation waste containing alumina and iron oxides or sulfides.

A sample of sericitic-quartzite of approximately 40 percent sericite and 60 percent quartz had the following chemical analysis in percent by weight:

| | | |
|---|---|---|
| $Al_2O_3$ | — | 18.7 |
| $SiO_2$ | — | 74.7 |
| $Fe_2O_3$ | — | 1.0 |
| $K_2O$ | — | 5.1 |
| $Na_2O$ | — | 0.6 |
| $TiO_2$ | — | 0.3 |
| CaO | — | 0.02 |
| BaO | — | 0.02 |
| $ZrO_2$ | — | 0.08 |

A sample of magnetic glass prepared from a sericitic-quartzite was analyzed and found to contain 0.7% by weight $Na_2O$.

A magnetic fraction prepared from sericitic-quartzite and pyrite, comprised about 18% $Al_2O_3$, 64% $SiO_2$, 12.0% $Fe_2O_3$ and a small amount of $TiO_2$ as determined by X-Ray Fluorescence (XRF). About 45 percent of the magnetic fraction was amorphous magnetic glass as determined by X-Ray Diffraction (XRD). The amorphous fraction comprised about 8% $M_2O$ (M = an alkali metal), 28% $Al_2O_3$, 45% $SiO_2$ and 19% $Fe_2O_3$. If beneficiated sericite and pyrite are used, a highly amorphous (about 95 percent) magnetic glass is produced.

The invention is further illustrated by the following examples, wherein calcination was conducted in a limited air atmosphere (static system).

EXAMPLE I

A mineral sample of sericitic-quartzite and pyrite 1⅛ inches in diameter and 10 inches long was calcined for 12 hours at a temperature of 1240°C. A white ring approximately one-eighth–three-sixteenths inch thick about a black center was observed.

The calcined material was crushed and subjected to a magnetic separator 8000 gauss. The two fractions were analyzed by X-Ray Fluorescence (XRF) and X-Ray Diffraction (XRD) as follows:

A. Non-Magnetic Fraction (white in color)

| XRF | | XRD | |
|---|---|---|---|
| $Al_2O_3$ | — 18.9% | Quartz | — 60% |
| $SiO_2$ | — 80.7% | α-Cristabolite | — 5% |
| $Fe_2O_3$ | — 1.7% | Andalusite | — 10% |
| $TiO_2$ | — 0.8% | Amorphous | — 25% |

B. Magnetic Fraction (black in color)

| XRF | | XRD | |
|---|---|---|---|
| $Al_2O_3$ | — 18.4% | Quartz | — 35% |
| $SiO_2$ | — 63.9% | α-Cristabolite | — 15% |
| $Fe_2O_3$ | — 12.0% | Andalusite | — 5% |
| $TiO_2$ | — 0.7% | Amorphous (magnetic glass) | — 45% |

Quartz, cristabolite, sodium alumino silicate and andalusite are not normally magnetic. 12% $Fe_2O_3$ is within the detection level of XRD and the iron was in the amorphous phase thus resulting in a magnetic glass.

EXAMPLE II

A portion of the magnetic phase (8000 gauss) of Example I was resubjected to the magnetic separator at 4000 gauss. The magnetic fraction was remelted at 1300°C. The sample remained magnetic after cooling to room temperature.

EXAMPLE III

A sample of sericite ore was ground to minus 70 mesh (U.S. Sieve Series) with a sample of pyrite at a weight ratio of 5 parts sericite to one part pyrite. The mixture was melted at 1250°C overnight. The resulting product was slowly cooled from 1200°C to 500°C in 4 hours. The room temperature product was a black, magnetic material. Microscopic examination confirmed the product to be amorphous in structure. Some isolated crystals were noted, but they amounted to less than 3 to 5 percent of the sample.

EXAMPLE IV

A sample of sericite ore and pyrite was prepared as in Example III except that the weight ratio of sericite to pyrite was 1:1. The sample was fused at 1250°–1300°C overnight. The sample was cooled to 500°C in 1 hour to increase conductivity. The sample formed a foamed, black, magnetic material. Conductivity was measured and found to be lower than 10 K ohms across a one-eighth inch section. Conductivity over the top surface was 5–7 K ohms across one-eighth–one-fourth inch area. XRD analysis identified the surface to be mainly hematite. Hematite ($Fe_2O_3$) is considered a non-conductor in the electrostatic separation schemes, while pyrrhotite, pyrite and magnetite are considered to be conductors.

EXAMPLE V

For comparative purposes, two samples of soft glass with different iron species were prepared. One sample was composed of 5 parts of ground glass and one part of magnetite ($Fe_3O_4$) by weight. The other sample consisted of 4 parts of ground glass to one part of pyrite ($FeS_2$). Each of the samples were fused overnight at 1200°–1250°C and subsequently cooled to room temperature within a half-hour and tested for magnetic properties. There was no response to a hand magnet which easily picked up the magnetic glass samples of sericite and pyrite.

EXAMPLE VI

A sample of metallic iron in soft glass was prepared. Nominal bottle glass from the shelf was ground with metallic iron filings in a weight ratio of four parts of glass to one part of iron. The sample was fused overnight at 1250°–1300°C. The resulting product was a non-magnetic black solid.

From the foregoing examples, it is readily seen that a unique glass composition having magnetic properties has been produced.

The unusual properties of the magnetic glass may be adjusted or varied by the amount of pyrite added to the original mixture. The unique glass composition is basically sodium alumino silicate and iron sulfide.

Although not wishing to be bound by any particular theory, it is believed that pyrrhotite is the iron species responsible for the unexpected properties of the glass. Pyrrhotite is known to be magnetic, conductive and thermally stable.

At higher temperatures the reaction will normally proceed at a faster rate. The alumino silicate and iron sulfide are preferably heated from about 4 to about 12 hours at a temperature from about 1200°C to about 1600°C.

"Limited air" or a "limited air atmosphere" is defined by the amount of pyrite used in a particular glass formulation. The objective is to solubilize a magnetic iron specie into a glass solid solution. Considering the following reactions:

(1) $FeS_2$ (pyrite) $\xrightarrow{heat}$ $FeS$ (magnetic iron) $+ S$ (2) $FeS_2$ (pyrite) $+ O_2$ (air) $\xrightarrow{heat}$ $FeS$ (magnetic iron) $+ SO_2$ and (3) $2FeS$ (magnetic iron) $+ 3.5\, O_2$ (air) $\xrightarrow{heat}$ $Fe_2O_3$ (non-magnetic iron) $+ 2SO_2 \uparrow$ the amount of air (oxygen) dictates the degree of magnetic character of the glass. In reaction (1), where no oxygen is allowed to enter the system, the magnetic iron sulfide is a result of pyrite thermal decomposition. In reaction (2), a glass as magnetically susceptible as that of reaction (1) is produced. None of the iron is oxidized to a lesser or non-magnetic state. In reaction (3), the additional air reduces the degree of magnetic susceptibility of the glass by oxidizing the iron.

Therefore, a glass with the maximum magnetic susceptibility is produced when the atmospheric oxygen (pure oxygen or air) does not exceed 50 percent of the stoichiometric oxygen to oxidize the pyrite to ferric oxide. When the oxygen supply exceeds 50 percent of the stoichiometric requirements of the pyrite, the magnetic susceptibility is reduced proportionally.

A "limited air atmosphere" may therefore be defined as an atmosphere in which the oxygen available for reaction does not exceed 50 percent of the stoichiometric requirements of the iron sulfide or pyrite being calcined.

As will be evident to those skilled in the art, modifications of the invention can be made or followed in the light of the foregoing disclosure without departing from the spirit and scope of the claims.

What is claimed is:

1. A method of preparing a magnetic glass comprising the step of calcining or heating in an oxygen free atmosphere about 1–5 parts by weight of an alkali metal alumino silicate and one part by weight of iron sulfide, to a temperature of from about 1200°C to about 1600°C for a period of time sufficient to form an amorphous magnetic fraction.

2. The method of claim 1, wherein the calcining is conducted in a reducing atmosphere.

3. A method of preparing a magnetic glass comprising the step of calcining or heating in an oxygen free atmosphere about 1–5 parts by weight of sericitic-quartzite and one part by weight of pyrite to a temperature of about 1200°C to about 1600°C for a period of time sufficient to form an amorphous magnetic fraction.

4. The method of claim 3, wherein the sericitic-quartzite and pyrite are heated from about 4 to 12 hours.

5. The method of claim 3, wherein the heating is conducted in a reducing atmosphere.

6. A method of preparing a magnetic glass comprising the steps of:
   a. calcining about 1–5 parts by weight of an alkali metal alumino silicate and one part by weight of iron sulfide in a suitable container at a temperature of about 1200°C to about 1600°C in a limited air atmosphere for a period of time sufficient to form an amorphous magnetic fraction;
   b. crushing the material produced by step a;
   c. magnetically separating the material of step b into a magnetic fraction and a non-magnetic fraction, and
   d. heating the magnetic fraction to a temperature of about 1200°–1600°C in a limited air atmosphere, thereby forming a magnetic glass.

7. The method of claim 6, wherein the alkali metal alumino silicate and iron sulfide are heated from about 4 to 12 hours.

8. The method of claim 6, wherein the alkali metal alumino silicate comprises by weight about 7–13 percent alkali metal oxide, 20–38 percent alumina, and 50–73% silica.

* * * * *